(12) United States Patent
Gammel et al.

(10) Patent No.: US 7,181,576 B2
(45) Date of Patent: Feb. 20, 2007

(54) METHOD FOR SYNCHRONIZING A CACHE MEMORY WITH A MAIN MEMORY

(75) Inventors: Berndt Gammel, Markt Schwaben (DE); Thomas Kunemund, Munich (DE); Holger Sedlak, Sauerlach (DE)

(73) Assignee: Infineon Technologies AG, Munich (DE)

( * ) Notice: Subject to any disclaimer, the term of this patent is extended or adjusted under 35 U.S.C. 154(b) by 317 days.

(21) Appl. No.: 10/857,617

(22) Filed: May 27, 2004

(65) Prior Publication Data

US 2005/0005071 A1    Jan. 6, 2005

Related U.S. Application Data

(63) Continuation of application No. PCT/DE02/04066, filed on Oct. 31, 2002.

(30) Foreign Application Priority Data

Nov. 28, 2001   (DE)   ................ 101 58 393

(51) Int. Cl.
  *G06F 12/00*   (2006.01)
(52) U.S. Cl. ................ 711/144; 711/141; 711/143
(58) Field of Classification Search ............ None
  See application file for complete search history.

(56) References Cited

U.S. PATENT DOCUMENTS

| | | | |
|---|---|---|---|
| 4,319,079 A | | 3/1982 | Best |
| 4,573,119 A | | 2/1986 | Westheimer |
| 4,700,330 A | * | 10/1987 | Altman et al. ............... 365/222 |
| 5,045,996 A | * | 9/1991 | Barth et al. .................. 711/143 |
| 5,081,675 A | | 1/1992 | Kittirutsunetorn |
| 5,146,603 A | | 9/1992 | Frost |
| 5,481,610 A | * | 1/1996 | Doiron et al. ............... 380/270 |
| 5,630,166 A | * | 5/1997 | Gamache et al. ............. 712/29 |
| 6,009,498 A | * | 12/1999 | Kumasawa et al. ......... 711/113 |

(Continued)

FOREIGN PATENT DOCUMENTS

DE    199 57 810 A1    9/2000

(Continued)

OTHER PUBLICATIONS

Motorola M68040 User's Manual, Motorola Inc., 1990.

*Primary Examiner*—Reginald Bragdon
*Assistant Examiner*—Craig E Walter
(74) *Attorney, Agent, or Firm*—Dickstein, Shapiro, LLP.

(57) ABSTRACT

Method for synchronizing a cache memory with a main memory, the cache memory provided to buffer-store data between a processor and the main memory, and memory entries of the cache memory each having a data area and an identification area. The processor provides a synchronization value to determine which memory entries of the data area are to be synchronized with the main memory. A cache logic circuit of the cache memory then compares the synchronization value with contents of a memory field of each memory entry. When there is a match, the cache logic circuit checks a flag of a third memory field of the identification area for a first state, which indicates that a change was made to the data area of the memory entry since the last synchronization. When the flag is in the first state, the contents of the data area are transferred to the main memory.

26 Claims, 2 Drawing Sheets

U.S. PATENT DOCUMENTS

| | | | |
|---|---|---|---|
| 6,014,728 A * | 1/2000 | Baror | 711/133 |
| 6,092,172 A | 7/2000 | Nishimoto | |
| 6,157,999 A * | 12/2000 | Rossbach et al. | 712/243 |
| 6,745,294 B1 * | 6/2004 | Wilson et al. | 711/135 |

FOREIGN PATENT DOCUMENTS

| | | |
|---|---|---|
| EP | 0 319 647 | 6/1989 |
| EP | 0 347 040 A1 | 12/1989 |
| EP | 0 583 140 A1 | 2/1994 |
| EP | 0 720 098 A1 | 7/1996 |
| EP | 0 752 662 A1 | 1/1997 |
| EP | 0 439 325 B1 | 5/1999 |
| WO | WO-99/28887 A2 | 6/1999 |
| WO | WO-01/53931 A2 | 7/2001 |
| WO | WO-02/056184 A1 | 7/2002 |

* cited by examiner

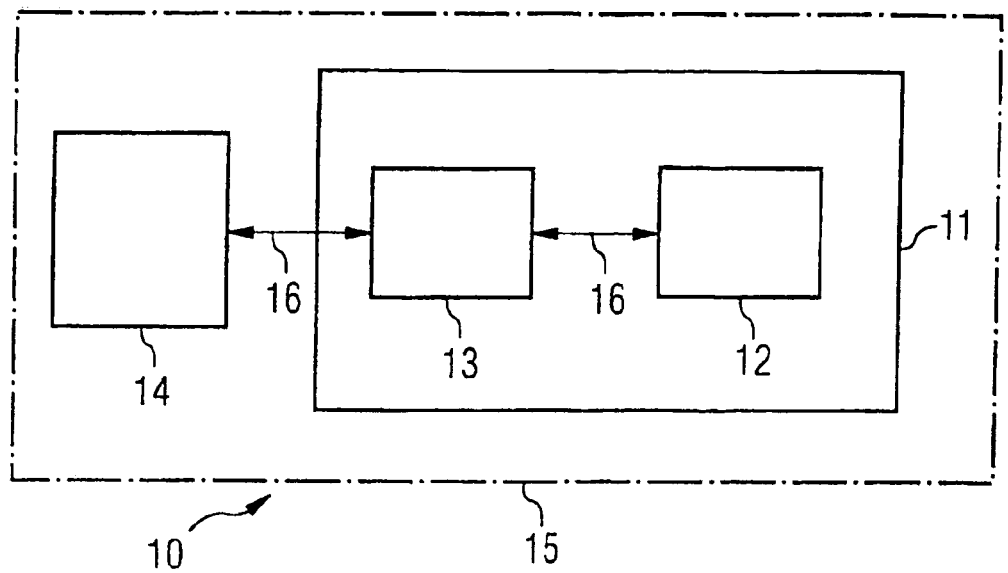
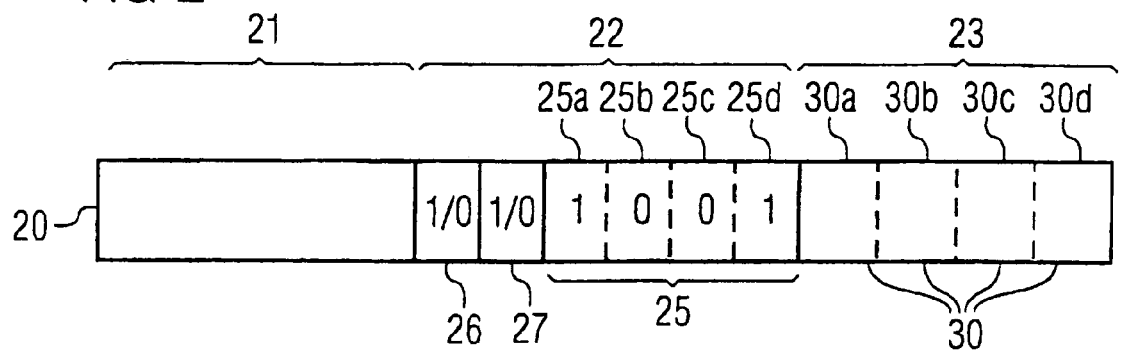
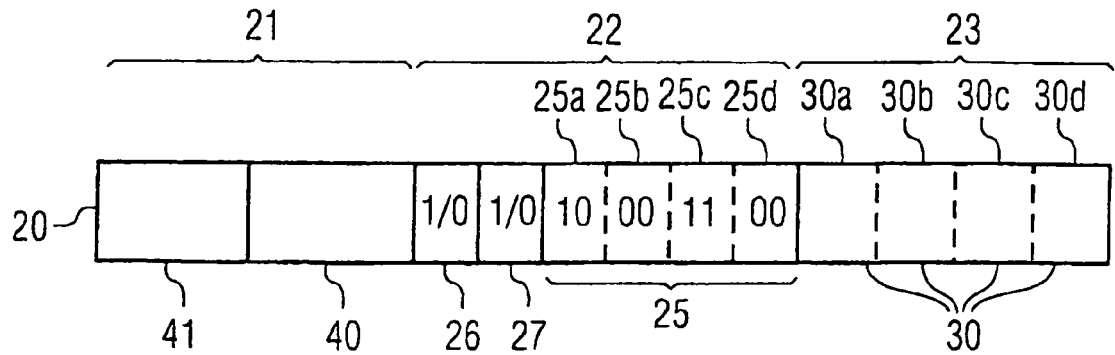

FIG 4

| i | | | 25a | 25b | 25c | 25d | 30a | 30b | 30c | 30d | |
|---|---|---|---|---|---|---|---|---|---|---|---|
| 123 | | 1 | 0 | 1 | 0 | 0 | 1 | | | | | 3 |
| 107 | | 1 | 1 | 1 | 0 | 0 | 1 | | | | | |
| 91 | | 1 | 0 | 0 | 1 | 1 | 1 | | | | | 2 |
| 73 | | 1 | 1 | 0 | 0 | 1 | 1 | | | | | |
| 43 | | 1 | 1 | 0 | 0 | 0 | 1 | | | | | 1 |
| 37 | | 1 | 1 | 1 | 0 | 0 | 1 | | | | | |
| 0 | | | | | | | | | | | | 0 |

Columns: 21, 22, 23; 26, 27, 25, 30; 13 though" or "write-back" strategies, and are described, for example, in the textbook "*Computer Architecture, A quantitative approach*" by J. L. Hennessey, D. A. Paterson, Second Edition, Morgan Kaufmann Publications, San Francisco, 1996.

METHOD FOR SYNCHRONIZING A CACHE MEMORY WITH A MAIN MEMORY

CROSS-REFERENCE TO RELATED APPLICATION

This application is a continuation of International Patent Application Serial No. PCT/DE02/04066, filed Oct. 31, 2002, which published in German on Jun. 12, 2003 as WO 03/048943, and is incorporated herein by reference in its entirety.

FIELD OF THE INVENTION

The invention relates to a method for synchronizing a cache memory with a main memory, the cache memory being provided to buffer-store data between a processor and a main memory, and memory entries of the cache memory having at least one data area and one identification area.

The invention also relates to a cache memory for carrying out the method.

BACKGROUND OF THE INVENTION

Cache memories are provided in almost all modern computers as very fast buffer memories between the processor and the main memory, and are called processor cache memories or often also CPU cache for short. A CPU cache is significantly faster, but for cost reasons also significantly smaller, than the main memory. Compared to a central processing unit without CPU cache, the execution speed of a central processing unit with CPU cache is significantly greater—given that the main memories are the same size of course.

A distinction is made between first-level cache memories and second-level cache memories. The first-level cache memory is located directly in the processor, so that it can be accessed by the processor at the processor clock rate without wait cycles. The second-level cache memory, on the other hand, is located on a main board, for example, and therefore operates at the board clock rate, which is slower than the processor clock rate.

In addition, microprocessors need a stack memory, also called a "stack", to process programs that they are to execute. Whenever the processor needs to process not only sequentially consecutive program instructions when processing a program, but needs to perform a program jump, for instance when there is a call to a subroutine, the stack is used to hold a return address. After completing the subroutine, it jumps back to this address in order to resume processing the program from the same place from where it performed the subroutine jump. A stack in this case is normally a volatile memory.

Both the CPU cache and the stack must be synchronized with the main memory of a computer. There are many standard techniques that can be used to implement such CPU caches and to perform synchronization with the main memory. These standard techniques are known as "write-through" or "write-back" strategies, and are described, for example, in the textbook "*Computer Architecture, A quantitative approach*" by J. L. Hennessey, D. A. Paterson, Second Edition, Morgan Kaufmann Publications, San Francisco, 1996.

Thus, for example, when processing programs, memory areas, more precisely memory entries in a cache memory or a stack, must be enabled or cleared so that other data can be saved there from the main memory. The following short example helps to explain this. In a "multitasking" environment, a task change, i.e. a call to another program, occurs. A new task B to be executed is normally located in the same logical memory area as an interrupted or completed task A. In order that task B cannot, erroneously or without authorization, access the data from task A still held in the CPU cache, the memory areas or memory entries of task A in the CPU cache and in the stack must be made invalid (invalidated) or cleared. It is known for this purpose to provide for a memory entry, which contains an address area, a data area assigned to the address area and an identification area assigned to the address area, a memory field that contains a flag. This memory entry is then invalidated, or made invalid, by taking the flag of the memory field to a first state that signals that the data saved in the data area has no validity.

In addition, it is known to provide an additional memory field in the identification area of a memory entry, that indicates by means of a flag whether the data area has been modified and the contents of the data area have still not been written back to the main memory. This write-back prior to invalidation of the memory entry is called synchronization.

The tasks of invalidation and write-back are typically performed by the operating system of the processor. Special control registers or instructions are available to the processor for this purpose, which can be used to invalidate or write back individual lines in a CPU cache. The use of control registers, control mechanisms or instructions is also known as a means of invalidating or writing back all the memory entries in a CPU cache. The former procedure described above has the disadvantage that the operating system needs a large amount of processing complexity and time to invalidate or write back larger memory areas of the CPU cache, but not all memory entries in the CPU cache. Complete invalidation or write-back of a CPU cache has the disadvantage that data from other tasks may also be synchronized unnecessarily, causing performance to suffer.

In order to maintain the cache coherence of a CPU cache with a main memory, EP 0 439 325 B1 proposes providing an address monitor.

SUMMARY OF THE INVENTION

It is the object of the invention to define an opportunity that makes it possible in a simple way to establish synchronization between a cache memory and a main memory.

This object may be achieved by a method according to the invention involving the following steps:

a) the processor provides a synchronization value for comparison purposes, this value being used to determine which memory entry, or which memory entries, of the data area of the cache memory is, or are, meant to be synchronized with the main memory, b) a cache logic circuit of the cache memory compares the synchronization value provided with the contents of the memory field, of which there is at least one, of each memory entry, c) where the synchronization value provided matches the contents of the memory field, of which there is at least one, the cache logic circuit of the cache memory checks a flag of a third memory field of the identification area for a first state, which indicates that a change has been made to the data area of the memory entry since the last synchronization, and d) where the flag is in the given first state, the contents of the data area of the memory entry are transferred to the main memory.

Consequently, the contents of a first memory field serve as search criterion for synchronization, where synchronization with the main memory only takes place for those memory entries for which the flag of the third memory field indicates a change to the data area since the last synchronization.

Preferably, where the flag of the third memory field has a state indicating that no change to the data area of the memory entry has taken place since the last synchronization, the flag of the second memory field is set to a first state that indicates that the memory entry has an invalid value. This method step provides a simple means of invalidating all those memory entries that in theory were to be written back, but which have undergone no change at all since the last synchronization. Alternatively it would obviously also be conceivable to clear the contents of the data areas concerned instead of taking the flag of the second memory field to a suitable state indicating invalidation. This may be advantageous particularly in applications with high security requirements.

In a further advantageous method step, the flag of the third memory field is taken to a second state indicating that there has been no change to the data memory of the memory entry since the last synchronization. In other words, this means that, after a successful synchronization procedure between a memory entry and the main memory, the flag of the third memory field is "cleared", so that synchronization with the main memory is not performed again in a further search process.

The synchronization of a memory entry with the main memory is an iterative process, so that the steps a) to d) or a) to e) respectively are repeated until there is no further match between the provided synchronization value and the contents of the first memory field of a memory entry.

The transfer of the contents of the data area of a memory entry into the main memory involves the following steps:
- aa) determining the address of the memory entry of the cache memory,
- bb) transferring to the processor the address from the address area of the memory entry,
- cc) addressing the memory entry by the processor,
- dd) reading the contents of the data area of the memory entry, and
- ee) saving the contents of the data area of the memory entry in the main memory.

A possible procedure for synchronizing a memory entry with the main memory thus involves transferring the address belonging to the memory entry from the address area to the processor when the value of the first memory field equals the synchronization value, and then applying a search procedure known per se within the cache memory, as is also familiar in the prior art.

Preferably, another flag can be set in a register between steps bb) and cc), the register being arranged outside the cache memory in the central processing unit and being able to be read by the processor. The flag is used as indicator that a write-back procedure has been performed. With the flag in the said register set, a search is made again for a set flag in the third memory field. As soon as the search process has started, the flag in the register is reset after step ee). If all the memory entries of the cache memory have been checked within one search pass and no flag is set in the register, then this means that all doubtful memory entries have been synchronized with the main memory.

The memory according to the invention is intended particularly for use in applications having high security requirements. In particular, the whole computer can be accommodated in one single chip, and be employed in a smart card, for example. Such a smart card can be used as a cash card, identity card, phone card, SIM card or the like. Its employment is particularly advantageous if different organizations, e.g. different service providers, save different programs in the computer that bear no relationship to each other. A cryptographic key can then be assigned to each program unit—assuming that each organization saves one program unit in the computer.

The method according to the invention for synchronizing a cache memory with a main memory can be implemented quickly and energy-efficiently, so that it is of particular interest for applications without their own power supplies. This applies, for example, to smart cards with contact-free operation.

In an advantageous embodiment of the invention, each memory entry in the memory has three memory areas: the data area contains the actual data, i.e. program commands or data to be processed, which have already been copied from the main memory or still need to be copied to this by a logic circuit of the processor; the address area contains the associated address; the identification area contains the information generated by the cache logic circuit, which is needed for managing the reloading of new data from the main memory and for replacing memory entries to be overwritten when the memory is full, and includes, e.g., information on whether the corresponding memory entry is valid, when it was last used and how frequently. In particular, a first memory field is provided in the identification area, which field contains a value indicating whether, or with which cryptographic key, data is saved in the data area of the memory.

The first memory field of the identification area fulfills two purposes.

First, it can be deduced from this whether, or with which cryptographic key, data is saved in the data area of the memory. This yields the information that there is a direct association between the first memory field and the data area. Especially for security-relevant applications, for instance with cash cards, it can be useful to save the data to be written to the data area in encoded form. As soon as the encoded data is to be read from this data area, a piece of information is required to specify which key can be used to decode the data. This information can be taken from the first memory field of the identification area, where the value of the first memory field can contain the cryptographic key itself, or else a pointer to a cryptographic key. In the description below, it is assumed that different program units, referred to as tasks in the introduction, are each encoded and decoded with a different key. This can result in each first memory field containing different keys or different values pointing to a cryptographic key.

The values present in the first memory field can now be used advantageously for synchronization of the cache memory with a main memory of a computer. When changing between two program units, it will normally be the case that the data assigned to the closed program unit and held in the cache memory is meant to be invalidated or written back. Owing to the fact that all memory entries containing data from the same program unit have an identical value in the first memory field of the identification area, these can be easily identified and processed further. The processor, which controls the program execution, and hence the change between two program units, merely needs to look in the first memory field for the value assigned to the program unit to be closed, and invalidate, clear or write back the associated data areas in each case.

In the simplest case, the first memory field of the identification area is one bit wide, so that it is possible to point to two different cryptographic keys.

In a preferred embodiment, the data area of a memory entry contains a plurality of words. A word in this case can have any bit width. It is obviously advantageous if all the words of a memory entry have the same bit width.

In such an embodiment, a first memory field is preferably assigned to each word of the data area. This means it is possible to assign a different cryptographic key to each word of a data area. A conceivable alternative would also involve providing even fewer assigned first memory fields, irrespective of the number of words in the data area of a memory entry. In this case more than one word in a data area would then be assigned to the same cryptographic key.

In a further advantageous embodiment of the memory, provision is made to divide the address area of a memory entry into a first address area containing a plurality of bits, which holds the physical address of the memory entry, and into a second address area containing a plurality of bits, which holds the most significant bits of a logical address of a program unit. Instead of this, the second address area could also contain a pointer to the logical address of a program unit. This approach has the following advantages: when changing between two program units, the processor can look in the second address area for the assigned logical addresses of the program unit to be closed. This means that even the data belonging to one program unit can be encoded with different cryptographic keys in the data areas of different memory entries. Although this achieves a very high degree of encoding complexity and also high reliability and security against unauthorized access, synchronization with the main memory of the computer turns out to be just as efficient as when searching for identical values in the first memory fields of the identification area.

A second memory field is preferably provided in the identification area, which field contains a flag indicating whether a valid or invalid value is saved in the data area. The second memory field is known in the prior art as a "valid flag". If the flag in the second memory field has a state corresponding to an invalid value, then the data area of the memory entry concerned can be cleared or changed with no further action. If the state of the flag in the second memory field represents a valid value, however, then synchronization with the main memory is required before the data can be changed or cleared.

It is also advantageous if the memory contains a third memory field in the identification area, which field contains a flag indicating whether a value in the data area of the memory has been changed by the processor. The third memory field is also called a "dirty flag". The flag in the third memory field assumes a first state as soon as a value in the data area of the memory entry concerned has been changed. The flag signals, e.g. when changing between two program units, that the corresponding contents of the data area must be synchronized with the main memory.

Preferably the memory is designed as an "n-way set associative cache memory". This type of memory has the advantage that the processor can access a memory entry of the cache memory in a selective way, even when this memory contains a large number of memory entries. n-way set associative cache memories have been known in the art for a long time, so that no further explanation of the operation and the associated advantages is given here.

The computer according to the invention includes the memory described above, which is coupled to a processor. In addition, a means of connection is provided, which is coupled to the memory and/or the processor. Furthermore, the means of connection is coupled to the main memory, which, for example, can be designed as an external memory outside a processor chip containing the central processing unit and the cache memory.

BRIEF DESCRIPTION OF THE DRAWINGS

The invention is described in more detail below with reference to exemplary embodiments and using the attached drawings, in which:

FIG. 1 shows schematically the structure of the computer according to the invention, FIG. 2 shows the structure of a memory entry in a first embodiment, FIG. 3 shows the structure of a memory entry in a second embodiment, and FIG. 4 shows a memory consisting of a multiplicity of memory entries that is designed as an n-way set associative memory.

DETAILED DESCRIPTION OF THE PREFERRED MODE OF THE INVENTION

FIG. 1 contains a schematic representation of the structure of a computer 10 in an exemplary embodiment. The computer 10 contains a processor 12, a main memory 14 and a memory (cache memory) 13, which are connected to each other via a respective means of connection 16, for instance a bus line. The computer 10 may contain additional components, for example a means of input/output connected to all the said components. The means of input/output controls the transfer of data between the central processing unit 11 and peripheral devices (not shown), such as keyboard, screen, printer, magnetic disk store, disk drive, CD-ROM drive, modem, read/write device etc. The processor 12 and the memory 13 together form the central processing unit 11. The central processing unit 11 and the main memory 14, plus any other components that may be present, are preferably integrated on a single chip. This is shown schematically by the dashed line labeled with the reference numeral 15.

Although the central processing unit 11 as shown in FIG. 1 only contains one processor 12 that can access the memory 13, at least one further processor (not shown) can also be provided that, like the processor 12 shown, accesses the memory 13 and possibly the memory 14.

FIG. 2 shows the structure of a memory entry according to the invention in a first embodiment. The memory entry has, as is known in the art, an address area 21, a data area 23 and an identification area 22. The data area 23 contains the actual data, while the address area 21 contains the memory address of the corresponding memory entry 20. The identification area 22 contains information on the validity of the memory entry (second memory field 26), and information as to whether data in the data area 23 has been changed since the last synchronization (third memory field 27). The third memory field is also known in the prior art as the "dirty flag". The second memory field is normally called the "valid flag".

In addition, a first memory field 25 is provided in the identification area 22. The memory field 25 is, for example, subdivided into four memory fields 25a to 25d. A sub-data-area 30a to 30d of the data area 23 is assigned to each of the memory fields 25a to 25d. Each of the sub-data-areas 30a to 30d is designed to be one word, where each word can be 32-bits wide for example. The first memory fields 25a to 25d each contain a piece of information indicating which cryptographic key has been used to encode the data in the areas 30*a* to 30*d*. Specifically, this means that the cryptographic key assigned in the first memory field 25*a* encodes and decodes data in the data area 30*a*. In a similar way, the data in the data area 30*d* can be processed with the cryptographic key assigned to the first memory field 25*d*. If, for example, each field is 1 bit wide, then a pointer to a total of two cryptographic keys is possible. The cryptographic keys can be saved in a separate register, which is not described in more detail. The processor, which reads the value of the first memory field 25 from a memory entry 20, can then determine the assigned cryptographic key in the register concerned, and decode the data held in encoded form in the sub-data-areas 30*a* to 30*d* assigned to the respective first memory field.

It is also conceivable that, instead of saving a pointer to a cryptographic key in the first memory fields 25*a* to 25*d*, the cryptographic key is held directly in the first memory fields. This is a useful alternative particularly when there are very many, though very short, cryptographic keys. Of course each of the memory fields 25*a* to 25*d* would then need to be more than one bit wide.

FIG. 3 shows another exemplary embodiment of a memory entry 20 according to the invention. This differs from the memory entry in FIG. 2 in that the address area 21 is subdivided into a first and a second address area 40, 41. Each of the address areas 40, 41 is bit wide. The first address area 40, which is 16 bits wide, for example, contains the physical address of a memory entry. The second address area 41, which is 12 bits wide for example, contains the most significant bits of a logical address of a program unit. Here it is assumed that each program unit is written to a defined logical address space. The logical addresses of this memory block are all identical. This means that a program unit can be identified from the most significant bits of the logical addresses. If all the memory entries in the cache memory according to the invention that belong to one program unit are meant to be synchronized with the main memory, then a search can be made for all identical values in the second address area of the cache memory. This has the advantage that different cryptographic keys can also be used within one program unit.

In the first exemplary embodiment of FIG. 2, the values entered in the first memory fields 25 are used as search criterion for a synchronization. As will become apparent from the following description of FIG. 4, which shows a memory having n memory entries, in this case not just one of the sub-memory-fields 25*a* to 25*d* is used as comparison criterion, but instead the whole bit sequence saved in the first memory field 25.

The memory 13 shown in FIG. 4 is designed as a four-way set associative cache memory. The memory 13 contains a total of 4 sets, which are numbered consecutively from 0 to 3 on the right-hand side. Each of the four sets contains an identical number of memory entries. The design and mode of operation of an n-way set associative cache memory is known from the prior art and therefore needs no further explanation here. The way in which the cache memory 13 is synchronized with the main memory 14 can be explained clearly, however, from FIG. 4.

Two memory entries are highlighted by way of example in each of the sets 1 to 3, where each identification area 22 has been provided with data. Here, i refers to the index of the memory entry. i is a value from (0, 1, . . . n×m−1), where n is the number of sets and m the number of memory entries per set.

As has already been illustrated in the description of FIG. 2, each of the sub-memory-fields 25*a* to 25*d* is assigned to one of the sub-data-areas 30*a* to 30*d*. Since each of the sub-memory-fields 25*a* to 25*d* is only one bit wide, a value "1" points to a first cryptographic key, and a value "0" points to a second cryptographic key, with which the data in the respective assigned sub-data-areas 30*a* to 30*d* is encoded. Since it is assumed that one cryptographic key is assigned to one specific program unit, this means that, wherever there is a pointer to this cryptographic key in the first memory field 25, the associated sub-data-area contains an item of data that may need to be synchronized. Thus the information held in the address area 21 is not used for synchronization; instead the pointers to cryptographic keys contained in the first memory field 25 are examined.

Consider, for example, that all those memory entries that are assigned a "0" in the memory fields 25*a* to 25*d* are meant to be synchronized. To this end, the processor will transfer to a cache logic circuit a synchronization value that covers all values except "1-1-1-1". On comparing this synchronization value with the four-bit value of the first memory field 25, the memory entries 37, 43, 73, 91, 107 and 123 will consequently be flagged as hits. After finding these memory entries, the cache logic circuit checks in which of these the third memory field 27 contains a second state (here "0"). This is the case in the memory entries 91 and 123. The second state of the third memory field 27 indicates that there has been no change in one of the sub-data-areas 30*a* to 30*d* since the synchronization. Thus the flags in the second memory fields 25 in the memory entries 91 and 123 can be invalidated. This means that the flags in the second memory field 26 in the said memory entries 91 and 123 are taken to a first state (here 0).

In the remaining memory entries 37, 43, 73 and 107, synchronization with the main memory is necessary before invalidation. Synchronization in this case means that the data lying in the corresponding sub-data-areas 30*a* to 30*d* is transferred to the main memory. For synchronization, the cache logic circuit notes the address of the first memory entry found, the search pass being performed for example, from memory entry 0 in ascending numerical order of the memory entries. The first memory entry producing a hit has the number 37. The cache logic circuit outputs the address of the corresponding set, in this example set 1. Simultaneously, another flag can be set in a special register (known as a write-back register) to indicate that a write-back procedure has been performed. Then the address area (21) of the memory entry can be read by the cache logic circuit addressing this set. The usual write-back procedure is performed by carrying out an associative search process using the address area just read in this way, i.e. the contents of the address area of the memory entry is saved in the main memory, and the flags of the second and third memory fields 26, 27 are reset. The cache logic circuit knows from the additional flag set in the write-back register that another search process must be launched. Once this has happened, the additional flag in the write-back register is reset. If another memory entry is found in which the synchronization value matches the 4-bit code of the first memory field 25, then the procedure just described takes place again from the beginning. If the cache logic circuit has run through all the memory entries from 0 to n×m−1 without a flag having been set in the write-back register, then this means that all doubtful memory entries have been synchronized.

The invention claimed is:

1. A method for synchronizing a cache memory with a main memory, the cache memory provided to buffer-store data between a processor and the main memory, and memory entries of the cache memory each having at least one data area and one identification area, the method comprising the steps of:
- a) providing, using the processor, a synchronization value for comparison purposes, the synchronization value being used to determine which memory entry or entries of the cache memory is/are to be synchronized with the main memory;
- b) comparing, using a cache logic circuit of the cache memory, the synchronization value provided with contents of at least one memory field of each memory entry;
- c) when the synchronization value provided matches the contents of the at least one memory field, checking, using the cache logic circuit of the cache memory, a first flag of a third memory field of the identification area for a first state, which indicates that a change has been made to the data area of the memory entry since the last synchronization; and
- d) when the first flag is in the first state, transferring the contents of the data area of the memory entry or entries to the main memory.

2. The method according to claim 1, wherein the memory field used for the comparison contains a value indicating with which cryptographic key data is saved in the data area of the memory entry or entries.

3. The method according to claim 1, wherein the memory field used for the comparison contains a cryptographic key.

4. The method according to claim 1, wherein the memory field used for the comparison contains a pointer to the cryptographic key.

5. The method according to claim 1, wherein the data area of one of the memory entries contains a plurality of words.

6. The method according to claim 5, wherein a first memory field is assigned to each word of the data area.

7. The method according to claim 1, wherein an address area of each of the memory entries is divided into a first address area containing a plurality of bits, which holds the physical address of the respective memory entry, and into a second address area containing a plurality of bits, which holds the most significant bits of a logical address of a program unit.

8. The method according to claim 1, wherein a second memory field is provided in the identification area, which field contains a second flag indicating whether a valid or invalid value is saved in the data area.

9. The method according to claim 8, wherein, where the second flag has a second state indicating that no change to the data area of the memory entry has taken place since the last synchronization, the second flag indicating whether a valid or invalid value is saved in the data area is set to a first state that indicates that the memory entry has an invalid value.

10. The method according to claim 1, wherein the steps a) to d) are repeated until there is no match between the synchronization value and the contents of at least one memory field of a memory entry used for the comparison.

11. The method according to claim 1, wherein the step d) of transferring the contents of the data area of one of the memory entries into the main memory comprises the steps of:
- aa) determining the address of the memory entry of the cache memory;
- bb) transferring to the processor the address from the address area of the memory entry;
- cc) addressing the memory entry by the processor;
- dd) reading the contents of the data area of the memory entry; and
- ee) saving the contents of the data area of the memory entry in the main memory.

12. The method according to claim 11, wherein between steps bb) and cc) a third flag is set in a register which is arranged outside the cache memory and can be read by the processor, the third flag indicating that a write-back procedure has been performed.

13. The method according to claim 12, wherein after step ee), the third flag in the register is reset once the cache memory has performed another comparison procedure between the synchronization value and the contents of the memory field used for the comparison of each memory entry.

14. A cache memory which is provided to carry out the method according to claim 1.

15. A cache memory which is provided to carry out the method according to claim 2.

16. A cache memory which is provided to carry out the method according to claim 3.

17. A cache memory which is provided to carry out the method according to claim 4.

18. A cache memory which is provided to carry out the method according to claim 5.

19. A cache memory which is provided to carry out the method according to claim 6.

20. A cache memory which is provided to carry out the method according to claim 7.

21. A cache memory which is provided to carry out the method according to claim 8.

22. A cache memory which is provided to carry out the method according to claim 9.

23. A cache memory which is provided to carry out the method according to claim 10.

24. A cache memory which is provided to carry out the method according to claim 11.

25. A cache memory which is provided to carry out the method according to claim 12.

26. A cache memory which is provided to carry out the method according to claim 13.

* * * * *